United States Patent [19]

Sugimoto et al.

[11] Patent Number: 4,470,937
[45] Date of Patent: Sep. 11, 1984

[54] SIZE CONTROL OF EXTRUSION MOLDED ARTICLES

[75] Inventors: Masakazu Sugimoto, Amagi; Shuji Kuhara, Sayama; Takeshi Kusaba, Higashimurayama, all of Japan

[73] Assignee: Bridgestone Tire Company, Limited, Tokyo, Japan

[21] Appl. No.: 396,341

[22] Filed: Jul. 8, 1982

[30] Foreign Application Priority Data

Jul. 14, 1981 [JP] Japan ............................ 56-109664

[51] Int. Cl.³ .............................................. B29F 3/06
[52] U.S. Cl. ................................ 264/40.1; 264/40.7; 425/140; 425/141; 425/145; 425/163
[58] Field of Search ............... 425/140, 141, 145, 163; 264/40.1, 40.7, 169

[56] References Cited

U.S. PATENT DOCUMENTS

| 2,916,792 | 12/1959 | Crook et al. | 425/145 |
| 3,148,231 | 9/1964 | Spencer | 264/40.7 |
| 3,890,078 | 6/1975 | Straumanis | 425/145 |
| 3,904,338 | 9/1975 | Straumanis | 264/40.7 |
| 3,989,779 | 11/1976 | Brunnhofer | 425/145 |
| 4,097,566 | 6/1978 | Bertin et al. | 425/141 |
| 4,156,913 | 5/1979 | Apicella, Jr. | 425/141 |

FOREIGN PATENT DOCUMENTS 2251769 10/1972 Fed. Rep. of Germany ...... 425/145

Primary Examiner—Jeffery R. Thurlow

[57] ABSTRACT

In a screw-type cold feed extrusion molding apparatus is provided a size control device adapted to control the sizes of extrusion molded articles through detection of the load current of the motor for driving the feed screw and take-off conveyor of the extrusion molding apparatus at speeds which vary in such a manner as to enable a molding material to be fed smoothly from the inlet toward the extrusion die of the apparatus so that fluctuations which would otherwise be caused in the sizes of the extrusion molded articles due to the presence of a molding material stagnant in the inlet of the apparatus are precluded reliably.

6 Claims, 1 Drawing Figure

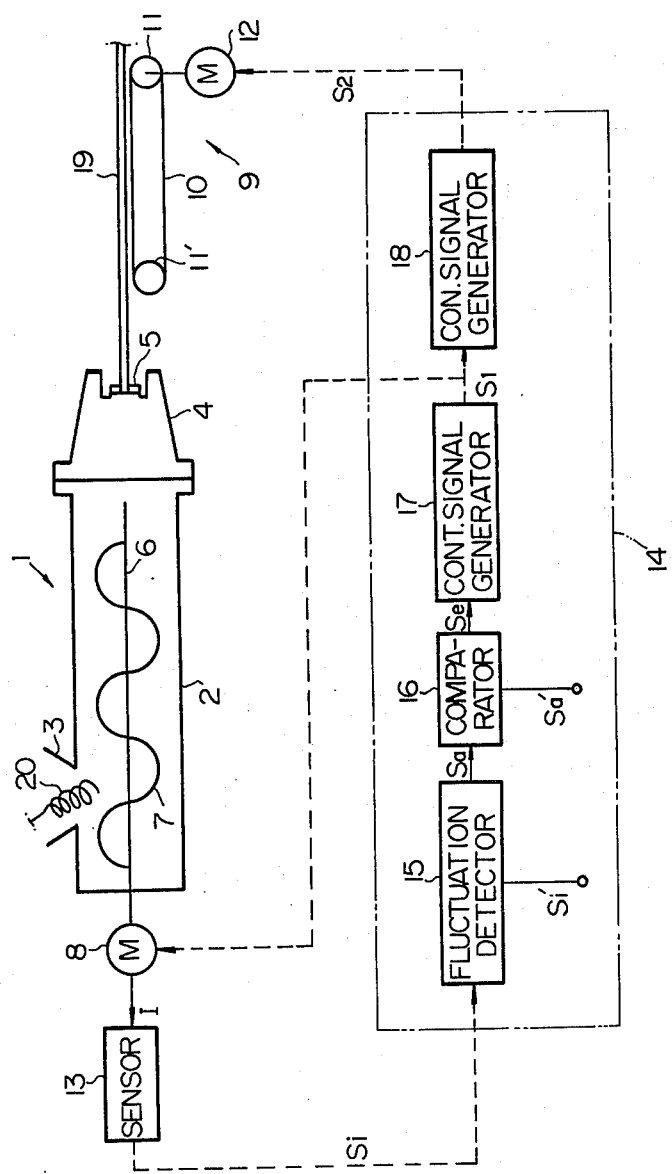

SIZE CONTROL OF EXTRUSION MOLDED ARTICLES

FIELD OF THE INVENTION

The present invention relates to a method of and a device for controlling screw-drive and conveyor-drive motors of a screw-type cold feed extrusion molding apparatus for extruding a synthetic or natural rubber compound or a thermoplastic or thermosetting synthetic resin into films, sheets, filaments, cords, rods, tubes, or other profiles.

BACKGROUND OF THE INVENTION

In the field of extrusion molding of rubber or plastic compounds with use of screw-type cold feed extrusion molding machines, difficulties have thus far been encountered in precisely controlling the sizes of molded products. In order to obviate such difficulties, an attempt has been made to provide in an extrusion molding machine such control means as to regulate the revolution speed of the feed screw incorporated in the machine and to thereby control the sizes of the products issuing from the die. The size control means includes a pressure sensor located at the die of the extrusion molding machine to detect the pressure of the material pressurized by the feed screw being driven for rotation in the extrusion molding machine. The pressure sensor produces an electric signal indicative of the pressure of the material thus detected and the control means is operative to control the revolution speed of the feed screw on the basis of such a signal. A drawback has however been pointed out in connection with control means of this nature in that the control means must be constructed and designed individually depending upon the types, shapes and sizes of the products to be extruded since the dies per se must be exchanged with other ones for producing articles of different types, shapes and sizes. Another drawback of the prior-art size control means is that the pressure sensor located at the die of the extrusion molding machine is not precisely responsive to the pressure applied to the material at the outlet end of the die and, for this reason, the control over the sizes of the extruded products on the basis of the signals produced by the sensor is not fully reliable.

Whereas, it is well known in the art that the sizes of extrusion molded articles produced by a screw-type cold feed extrusion molding machine can not be controlled precisely even when the material to be extruded is supplied to the extrusion molding machine at a precisely controlled rate. Various research and development efforts have been made by the inventors of the present invention to clear up the causes of this. The efforts have made it clear that the contradiction as above noted is accounted for by the fact that the material supplied to a cold feed extrusion molding machine tends to stagnant and form a lump or "bank" in the neighborhood of the inlet of the extrusion molding machine and thus partially fails to be fed to the feed screw. If the bank thus formed in the inlet of the extrusion molding machine grows larger, the molding material subsequently supplied to the extrusion molding machine is impeded from smoothly entering the machine and might fail to reach the die, occasionally giving a rise to a decrease in the delivery rate of the extrusion molding machine. The inventors of the present invention have further ascertained that the presence of a bank in the inlet of a cold feed extrusion molding machine causes a fluctuation in the load current of the motor driving the feed screw of the extrusion molding machine if the feed screw is driven for rotation at a constant speed. This means that the presence of a bank in a cold feed extrusion molding machine can be detected through detection of a change in the load current of the motor in the extrusion molding machine.

It is, accordingly, an important object of the present invention to provide an improved method of precisely controlling the screw-drive and conveyor-drive motors of a screw-type cold feed extrusion molding machine which is subject to formation of a bank of the molding material stagnant in the inlet of the extrusion unit.

It is another important object of the present invention to provide a method of controlling the screw-drive and conveyor-drive motors of a screw-type cold feed extrusion molding machine through detection of the load current of the motor for driving the feed screw and the take-off conveyor of the extrusion molding machine at controlled speeds in the presence of a bank of the molding material in the inlet of the extrusion unit.

It is still another important object of the present invention to provide in a screw-type cold feed extrusion molding apparatus an improved control device for controlling the screw-drive and conveyor-drive motors of the extrusion molding apparatus through detection of the formation of a bank of the molding material stagnant in the inlet of the extrusion unit.

It is, yet, still another important object of the present invention to provide in a screw-type cold feed extrusion molding apparatus a control device for controlling the screw-drive and conveyor-drive motors of the extrusion molding apparatus through detection of the load current of the motor.

SUMMARY OF THE INVENTION

In accordance with one important aspect of the present invention, there is provided in a screw-type cold feed extrusion molding system including an extrusion unit having an inlet through which a molding material is to be supplied to the extrusion unit, an extrusion die through which an extrusion molded article is to be delivered from the extrusion unit and a feed screw rotatable in the extrusion unit and operative to feed the molding material from the inlet toward the extrusion die; take-off conveyor means operative to convey the extrusion molded article away from the extrusion die; electric screw-drive means operative to drive the feed screw for rotation at a fixed speed, the load current on the screw-drive means being variable with the rate at which the molding material is supplied to the extrusion unit and having values approximating a fixed value in the absence of a molding material stagnant in the inlet of the extrusion unit; and electric conveyor-drive means operative to drive the conveyor means at a fixed take-off speed related to the fixed speed of rotation of the feed screw, a method of controlling the screw-drive means and the conveyor-drive means, comprising detecting the load current of the screw-drive means and producing a first signal representative of the detected load current, producing a second signal representative of the fixed value of the load current of the screw-drive means, producing, on the basis of the first and second signals, a third signal representative of an index value which is variable with the signal representative of the detected load current and which is indicative of a degree of fluctuation in the detected load current with respect to the value represented by the second signal, producing a fourth signal representative of a predetermined degree of fluctuation in the load current of the screw-drive means, the predetermined degree of fluctuation corresponding to a predetermined degree of stagnancy of the molding material in the inlet of the extrusion unit, comparing the third and fourth signals with each other for determining whether the degree of fluctuation represented by the third signal is higher or lower than the predetermined degree of fluctuation represented by the fourth signal, producing a first control signal which is effective to increase the output speed of the screw-drive means when it is determined that the degree of fluctuation represented by the third signal is higher than the predetermined degree of fluctuation represented by the fourth signal and to decrease the output speed of the screw-drive means when it is determined that the degree of fluctuation represented by the third signal is lower than the predetermined degree of fluctuation represented by the fourth signal supplying the first control signal to the screw-drive means for causing the screw-drive means to drive the feed screw for rotation at a speed varying at a predetermined rate in accordance with the first control signal, producing, on the basis of the first control signal, a second control signal effective to increase the output speed of the conveyor-drive means at a rate related to the rate of increase of the output speed of the screw-drive means, supplying the second control signal to the conveyor-drive means for causing the conveyor-drive means to drive the conveyor means at a speed varying at the rate related to the rate of increase of the output speed of the screw-drive means. Preferably, when it is determined that the degree of fluctuation represented by the third signal is higher than the predetermined degree of fluctuation represented by the fourth signal, the first control signal is effective to increase the output speed of the screw-drive means in such a manner as to increase the speed of rotation of the feed screw toward the above mentioned fixed speed and the second control signal is effective to increase the output speed of the conveyor-drive means in such a manner as to increase the operating speed of the conveyor means toward the above mentioned fixed take-off speed.

In accordance with another important aspect of the present invention there is provided in a screw-type cold feed extrusion molding apparatus including an extrusion unit having an inlet through which a molding material is to be supplied to the extrusion unit, an extrusion die through which an extrusion molded article is to be delivered from the extrusion unit and a feed screw rotatable in the extrusion unit and operative to feed the molding material from the inlet toward the extrusion die; take-off conveyor means operative to convey the extrusion molded article away from the extrusion die; electric screw-drive means operative to drive the feed screw for rotation at a fixed speed, the load current on the screw-drive means being variable with the rate at which the molding material is supplied to the extrusion unit and having values approximating a fixed value in the absence of a molding material stagnant in the inlet of the extrusion unit; and electric conveyor-drive means operative to drive the conveyor means at a fixed take-off speed related to the fixed speed of rotation of the feed screw, a method of controlling the screw-drive means and the conveyor-drive means, a device for controlling the screw-drive means and the conveyor-drive means, comprising detecting means operative to detect the load current of the screw-drive means and to produce a first signal representative of the detected load current, producing a second signal representative of the fixed value of the load current of the screw-drive means, fluctuation detecting means operative to produce, on the basis of the first and second signals, a third signal representative of an index value which is variable with the signal representative of the detected load current and which is indicative of a degree of fluctuation in the detected load current with respect to the value represented by the second signal, producing a fourth signal representative of a predetermined degree of fluctuation in the load current of the screw-drive means, the predetermined degree of fluctuation corresponding to a predetermined degree of stagnancy of the molding material in the inlet of the extrusion unit, comparator means operative to compare the third and forth signals with each other for determining whether the degree of fluctuation represented by the third signal is higher or lower than the predetermined degree of fluctuation represented by the fourth signal, first control signal generating means operative to produce a first control signal which is effective to increase the output speed of the screw-drive means when it is determined that the degree of fluctuation represented by the third signal is higher than the predetermined degree of fluctuation represented by the fourth signal and to decrease the output speed of the screw-drive means when it is determined that the degree of fluctuation represented by the third signal is lower than the predetermined degree of fluctuation represented by the fourth signal, the first control signal being supplied to the screw-drive means for causing the screw-drive means to drive the feed screw for rotation at a speed varying at a predetermined rate in accordance with the first control signal, second control signal generating means operative to produce, on the basis of the first control signal, a second control signal effective to increase the output speed of the conveyor-drive means at a rate related to the rate of increase of the output speed of the screw-drive means, the second control signal being supplied to the conveyor-drive means for causing the conveyor-drive means to drive the conveyor means at a speed varying at the rate related to the rate of increase of the output speed of the screw-drive means.

BRIEF DESCRIPTION OF THE DRAWING

The features and advantages of a method and a device according to the present invention will be more clearly appreciated from the following description taken in conjunction with the accompanying drawing which schematically shows a preferred embodiment of a control device embodying the present invention.

DESCRIPTION OF THE PREFERRED EMBODIMENTS

Referring to the drawing, a screw-type cold feed extrusion molding apparatus including a control device embodying the present invention comprises an extrusion unit 1 including an elongated, hollow cylindrical body structure 2 which has an upwardly open inlet constituted by a generally funnel-shaped hopper 3 through which a molding material such as, for example, a rubber or plastic compound is to be supplied into the body structure 2 during operation of the extrusion molding apparatus. The hopper 3 is open downwardly into the body structure 2 and is located in the neighborhood of one longitudinal end of the body structure 2.

The extrusion unit 1 further comprises an extrusion head 4 coupled to the body structure 2 at the other longitudinal end of the body structure 2. The extrusion head 4 has a horizontally open outlet constituted by an extrusion die 5 which is open at the rear end of the extrusion head 4. The body structure 2 is thus open to the extrusion head 4 at its longitudinal end opposite to the hopper 3 and forms an internal space extending between the extrusion die 5 and an end wall of the body structure 2 opposite to the extrusion head 4. As is customary in the art, the extrusion die 5 is formed with an orifice having a cross section similar in geometry to the cross section of an article to be extrusion molded, though not shown in the drawing. An elongated screw shaft 6 has securely carried thereon a feed screw 7 helically extending axially of the screw shaft 6. The screw shaft 6 extends longitudinally in the body structure 2 substantially throughout the length of the body structure 2 and, in the body structure 2, terminates immediately ahead of the extrusion head 4 as shown. The screw shaft 6 projects outwardly from the body structure 2 through the above mentioned end wall of the body structure 2 and is coupled at its leading end to the output shaft of an electric screw-drive motor 8 through a suitable reduction gear unit (not shown).

The extrusion molding apparatus shown in the drawing further comprises take-off conveyor means 9 comprising an endless take-off belt 10 which is arranged at the rear of the extrusion die 5 and which is passed under tension between drive and driven rollers 11 and 11'. The drive roller 11 is carried on a shaft (not shown) coupled to the output shaft of an electric conveyor-drive motor 12 through a suitable reduction gear unit, though not shown in the drawing. The take-off conveyor means thus constructed and arranged is adapted to convey an extrusion molded article from the extrusion die 5 toward suitable take-up means (not shown) located downstream of the conveyor means during operation of the extrusion molding apparatus.

In the extrusion molding apparatus thus constructed and arranged, a control device is provided to control respective output speeds of the motors 8 and 12, viz., the revolution speed of the feed screw 7 in the extrusion unit 1 and the take-off speed of the conveyor means 9. The control device comprises a load-current sensor 13 which is electrically connected to th coil unit of the screw-drive motor 8 and which is operative to detect the load current I of the screw-drive motor 8 and to produce an analog electric signal Si representative of the detected load current I. The analog electric signal Si thus produced by the load-current sensor 13 is fed to a control circuit 14 adapted to produce signals to dictate the respective output speeds of the motors 8 and 12. The load current of the motor 8 is variable with the rate at which a molding material is supplied to the extrusion unit 1 and has values approximating a certain fixed value in the absence of a bank of the molding material in the hopper 3. The control circuit 14 comprises a fluctuation detector 15 having two input terminals consisting of an input terminal connected to the load-current sensor 13 and an input terminal connected to a suitable source (not shown) of a reference signal Si' representative of a predetermined value $I_o$ which corresponds to the above mentioned fixed value of the load current of the screw-drive motor 8. The fluctuation detector 15 is operative to calculate, on the basis of the signals Si and Si', an index value Q indicative of a degree of fluctuation in the detected load current of the screw-drive motor 8 with respect to the valve Io represented by the signal Si' and produce an output signal Sa representative of the index value Q. More specifically, the fluctuation detector 15 is operative to calculate the index value Q by (1) calculating the difference between the detected load current I and the predetermined value $I_o$ of the load current of the screw-drive motor 8, (2) obtaining the square value of the difference, and (3) integrating the square value of the difference with respect to time. In the embodiment of the present invention, the index value Q represented by the signal Sa is therefore given as $$Q = \int (I-I_o)^2 dt.$$

The signal Sa thus produced by the fluctuation detector 15 is supplied to a comparator 16 having two input terminals consisting of an input terminal connected to the fluctuation detector 15 and an input terminal connected to a suitable source (not shown) of a reference signal Sa', representative of a predetermined value $Q_o$ which is representative of a predetermined degree of fluctuation in the load current of the motor 8, viz., a predetermined degree of stagnancy of the molding material in the hopper 8 of the extrusion unit 1. The comparator 16 is thus operative to compare the variable input signal Sa from the fluctuation detector 15 with the constant reference signal Sa' and produce an error signal Se representative of the difference in magnitude between the signals Sa and Sa'. The error signal Se thus produced by the comparator 16 is thus useful for determining whether the the degree of fluctuation in the load current of the motor as represented by the signal Sa is higher or lower than the predetermined degree represented by the reference signal Sa'. The signal Se is fed to a first control signal generator 17 operative to produce a first control signal $S_1$ representative of a target output speed of the screw-drive motor 8. The first control signal $S_1$ is supplied to the screw-drive motor 8 and the second control signal generator 18. The second control signal generator 18 is thus responsive to the control signal $S_1$ supplied from the first control signal generator 17 and is operative to produce a second control signal $S_2$ representative of a target output speed of the conveyor-drive motor 12. The second control signal $S_2$ is supplied to the conveyor-drive motor 12. The control signals $S_1$ and $S_2$ thus delivered from the first and second control signal generators 17 and 18 to the screw-drive and conveyor-drive motors 8 and 12, respectively, are such that the motors 8 and 12 are operative to drive the feed screw 7 at a predetermined revolution speed and the conveyor means 9 at a predetermined take-off speed in the absence of a bank of a molding material in the hopper 3 of the extrusion unit 1.

In operation, the screw shaft 6 carrying the feed screw 7 thereon is continuously driven by the screw-drive motor 8 at a speed proportional to the output speed of the motor 8 driving the screw shaft 6. At an incipient stage of operation, the screw-drive motor 8 is operated to produce a predetermined output speed in the absence of a bank of a molding material in the hopper 8. While the feed screw 7 is being thus driven for rotation about the center axis of the screw shaft 6, a suitable molding material such as a synthetic or natural rubber compound or a thermoplastic or thermosetting plastic compound is continuously fed to the extruder unit 1 through the hopper 3 at a predetermined, substantially constant rate. The molding material thus admitted through the hopper 3 into the body structure 2 is forcibly fed toward the extrusion head 4 by the feed screw 7 thus driven by the screw-drive motor 8 and is ultimately extruded through the orifice in the extrusion die 5, thereby producing an extrusion molded article 19 at the outlet end of the die 5. The extrusion molded article 19 is conveyed away from the extrusion die 5 by means of the endless take-off belt 10 continously travelling on the drive and driven rollers 11 and 11'. At an initial stage of operation, the conveyor-drive motor 12 is operated to produce a predetermined output speed in the absence of a bank of the molding material in the hopper 8 so that the extrusion molded article 19 on the take-off belt 10 is conveyed away from the extrusion die 5 at a speed proportional or otherwise related to the revolution speed of the screw shaft 6.

While the extrusion unit 1 and the conveyor means 9 are thus operative, a signal Si representative of the load current I of the screw-drive motor 8 is produced by the load-current sensor 13 and is fed to the fluctuation detector 15. In the absence of a bank of molding material in the hopper 3 of the extrusion unit 1, the load current I represented by the signal Si thus supplied from the load-current sensor 13 assumes values in the vicinity of the predetermined value $I_o$ represented by the reference signal Si' constantly supplied to the fluctuation detector 15.

If, now, the molding material being supplied into the extrusion unit 1 through the hopper 3 forms a bank on an internal surface portion of the hopper 3 as indicated at 20 in the drawing during operation of the extrusion molding apparatus, there is caused a change in the load current of the screw-drive motor 8 driving the screw shaft 6 so that the load current I detected by the load-current sensor 13 and represented by the signal Si supplied to the fluctuation detector 15 becomes larger or smaller than the predetermined value $I_o$ of the reference signal Si'. In response to the signal Si, the fluctuation detector 15 produces an output signal Sa representative of the above mentioned index value Q and delivers the signal Sa to the comparator 16 for comparison with the predetermined value $Q_o$ represented by the reference signal Sa' constantly applied to the comparator 16. If, in this instance, the calculated index value Q represented by the signal Sa is found in the comparator 16 to be larger than the predetermined value $Q_o$ represented by the signal Sa', it is assumed that there is a bank 20 formed in the hopper 3 of the extrusion unit 1 so that the comparator 16 delivers to the first control signal generator 17 an error signal Se enabling the control signal generator 17 to produce a control signal $S_1$ which is effective to cause the screw-drive motor 8 to increase the output speed thereof at a predetermined rate. Accordingly, the screw shaft 6 carrying the feed screw 7 in the extrusion unit 1 is driven for rotation at a gradually increasing speed so that the molding material supplied to the extrusion unit 1 through the hopper 3 thereof is fed to the extrusion head 4 at an increasing rate. The control signal $S_1$ produced by the first control signal generator 17 is fed not only to the screw-drive motor 8 but also to the second control signal generator 18 and causes the control signal generator 18 to produce a control signal $S_2$ which is effective to cause the conveyor-drive motor 12 to increase the output speed thereof at a predetermined rate which is proportional or otherwise related to the rate of increase of the output speed of the screw-drive motor 8. The take-off belt 10 is, accordingly, driven to travel at a gradually increasing speed and, as a consequence, the extrusion molded article 19 transferred from the die 5 to the take-off belt 10 is conveyed away from the die 5 also at a gradually increasing speed. As the molding material is fed to the extrusion head 4 of the extrusion unit 1 at an increasing rate and the extrusion molded article 19 is conveyed at an increasing speed from the die 5 as above described, the molding material thrown into the hopper 3 is enabled to pass therethrough more smoothly and is precluded from being stagnant in the hopper 3. The bank 20 which has been formed in the hopper 3 thus diminishes and, as a consequence, the extrusion molded article 19 delivered from the die 5 is enabled to maintain the predetermined sectional geometry. The load current I of the screw-drive motor 8 as detected by the load-current sensor 13 is thus reduced toward the predetermined value $I_o$ and is rendered substantially constant in the vicinity of the value $I_o$. It therefore follows that the index value Q calculated by the fluctuation detector 15 becomes smaller than the predetermined value $Q_o$. Under these conditions, it is determined in the comparator 16 that the bank 20 of the molding material in the hopper 3 is eliminated. The comparator 16 now delivers to the first control signal generator 17 a signal Se enabling the control signal generator 17 to produce a control signal $S_1$ which is effective to cause the screw-drive motor 8 to decrease the output speed thereof. Accordingly, the screw shaft 6 carrying the feed screw 7 in the extrusion unit 1 is driven for rotation at a gradually decreasing speed so that the molding material supplied to the extrusion unit 1 through the hopper 3 thereof is fed to the extrusion head 4 at a decreasing rate. In this instance, the output speed of the screw-drive motor 8 is reduced in such a manner as to reduce the revolution speed of the feed screw 7 toward the previously mentioned predetermined revolution speed thereof. The control signal $S_1$ produced by the first control signal generator 17 is fed also to the second control signal generator 18 and causes the control signal generator 18 to produce a control signal $S_2$ which is effective to cause the conveyor-drive motor 12 to decrease the output speed thereof at a predetermined rate which is proportional or otherwise related to the rate of decrease of the output speed of the screw-drive motor 8. The take-off belt 10 is, accordingly, driven to travel at a speed which gradually decreases toward the previously mentioned predetermined take-off speed thereof. The extrusion unit 1 and the take-off conveyor means 9 are in these manners enabled to restore the initial operating conditions prior to the formation of the bank 20 in the hopper 3.

While only one preferred embodiment of the present invention has hereinbefore been described, such an embodiment is merely illustrative of the gist of the present invention and, for this reason, may be modified and/or changed in numerous manner if desired. In lieu, for example, of the above described index value Q calculated in the fluctuation detector 15 of the control circuit 14, an index value may be calculated which is indicative of or related to the amplitude of the detected load current I represented by the signal Si supplied from the load-current sensor 13.

What is claimed is:

1. In a screw-type cold extrusion molding system including an extrusion unit having an inlet through which a molding material is to be supplied to the extrusion unit, an extrusion die through which an extrusion molded article is to be delivered from the extrusion unit and a feed screw rotatable in the extrusion unit and operative to feed the molding material from said inlet toward said extrusion die; take-off conveyor means operative to convey the extrusion molded article away from said extrusion die; electric screw-drive means operative to drive said feed screw for rotation at a fixed speed, the load current on the screw-drive means being variable with the rate at which the molding material is supplied to the extrusion unit and having values approximating a fixed value in the absence of a molding material stagnant in the inlet of the extrusion unit; and electric conveyor-drive means operative to drive said conveyor means at a fixed take-off speed related to said fixed speed of rotation of said feed screw, a method of controlling said screw-drive means and said conveyor-drive means comprising detecting the load current of said screw-drive means and producing a first signal representative of the detected load current, producing a second signal representative of said fixed value of the load current of said screw-drive means, producing, on the basis of the first and second signals, a third signal representative of an index value which is variable with the signal representative of the detected load current and which is indicative of a degree of fluctuation in the detected load current with respect to the value represented by said second signal, producing a fourth signal representative of a predetermined degree of fluctuation in the load current of said screw-drive means, the predetermined degree of fluctuation corresponding to a predetermined degree of stagnancy of the molding material in the inlet of said extrusion unit, comparing the third and fourth signals with each other for determining whether the degree of fluctuation represented by said third signal is higher or lower than the predetermined degree of fluctuation represented by said fourth signal, producing a first control signal which is effective to increase the output speed of the screw-drive means when it is determined that the degree of fluctuation represented by the third signal is higher than the predetermined degree of fluctuation represented by the fourth signal and to decrease the output speed of the screw-drive means when it is determined that the degree of fluctuation represented by the third signal is lower than the predetermined degree of fluctuation represented by the fourth signal, supplying the first control signal to said screw-drive means for causing the screw-drive means to drive said feed screw for rotation at a speed varying at a predetermined rate in accordance with the first control signal, producing, on the basis of said first control signal, a second control signal effective to increase the output speed of the conveyor-drive means at a rate related to the rate of increase of the output speed of said screw-drive means, and supplying the second control signal to said conveyor-drive means for causing the conveyor-drive means to drive said conveyor means at a speed varying at said rate related to the rate of increase of the output speed of the screw-drive means.

2. A method as set forth in claim 1, in which, when it is determined that the degree of fluctuation represented by the third signal is higher than the predetermined degree of fluctuation represented by the fourth signal, said first control signal is effective to increase the output speed of said screw-drive means in such a manner as to increase the speed of rotation of said feed screw toward said fixed speed and said second control signal is effective to increase the output speed of said conveyor-drive means in such a manner as to increase the speed of said conveyor means toward said fixed take-off speed.

3. A method as set forth in claim 1 or 2, in which said index value is calculated by (1) calculating the difference between the detected load current and said fixed value of the load current of the screw-drive means, (2) obtaining the square value of the difference, and (3) integrating the square value of the difference with respect to time.

4. In a screw-type cold extrusion molding apparatus including an extrusion unit having an inlet through which a molding material is to be supplied to the extrusion unit, an extrusion die through which an extrusion molded article is to be delivered from the extrusion unit and a feed screw rotatable in the extrusion unit and operative to feed the molding material from said inlet toward said extrusion die; take-off conveyor means operative to convey the extrusion molded article away fom said extrusion die; electric screw-drive means operative to drive said feed screw for rotation at a fixed speed, the load current on the screw-drive means being variable with the rate at which the molding material is supplied to the extrusion unit and having values approximating a fixed value in the absence of a molding material stagnant in the inlet of the extrusion unit; and electric conveyor-drive means operative to drive said conveyor means at a fixed take-off speed related to said fixed speed of rotation of said feed screw, a device for controlling the screw-drive means and the conveyor-drive means, comprising detecting means operative to detect the load current of said screw-drive means and to produce a first signal representative of the detected load current, first reference signal generating means operative to produce a second signal representative of said fixed value of the load current of said screw-drive means, fluctuation detecting means operative to produce, on the basis of the first and second signals, a third signal representative of an index value which is variable with the signal representative of the detected load current and which is indicative of a degree of fluctuation in the detected load current with respect to the value represented by said second signal, second reference signal generating means operative to produce a fourth signal representative of a predetermined degree of fluctuation in the load current of said screw-drive means, the predetermined degree of fluctuation corresponding to a predetermined degree of stagnancy of the molding material in the inlet of said extrusion unit, comparator means operative to compare the third and fourth signals with each other for determining whether the degree of fluctuation represented by said third signal is higher or lower than the predetermined degree of fluctuation represented by said fourth signal, first control signal generating means operative to produce a first control signal which is effective to increase the output speed of the screw-drive means when it is determined that the degree of fluctuation represented by the third signal is higher than the predetermined degree of fluctuation represented by the fourth signal and to decrease the output speed of the screw-drive means when it is determined that the degree of fluctuation represented by the third signal is lower than the predetermined degree of fluctuation represented by the fourth signal, the first control signal being supplied to said screw-drive means for causing the screw-drive means to drive said feed screw for rotation at a speed varying at a predetermined rate in accordance with the first control signal, second control signal generating means operative to produce, on the basis of said first control signal, a second control signal effective to increase the output speed of the conveyor-drive means at a rate related to the rate of increase of the output speed of said screw-drive means, the second control signal being supplied to said conveyor-drive means for causing the conveyor-drive means to drive said conveyor means at a speed varying at said rate related to the rate of increase of the output speed of the screw-drive means.

5. A device as set forth in claim 4, in which, when it is determined that the degree of fluctuation represented by said third signal is higher than the predetermined degree of fluctuation represented by said fourth signal, said first control signal generating means is operative so that the signal produced therefrom is effective to increase the output speed of said screw-drive means in such a manner as to increase the speed of rotation of said feed screw toward said fixed speed and said second control signal generator is operative so that the signal produced therefrom is effective to increase the output speed of said conveyor-drive means in such a manner as to increase the operating speed of said conveyor means toward said fixed take-off speed.

6. A device as set forth in claim 4 or 5, in which said fluctuation detecting means is operative to calculate said index value by (1) calculating the difference between the detected load current and said fixed value of the load current of the screw-drive means, (2) obtaining the square value of the difference, and (3) integrating the square value of the difference with respect to time.

* * * * *